Sept. 6, 1960     E. H. CUMPSTON, JR     2,951,518
WOOD SHAVING MACHINE WITH ROTARY CUTTER
HEAD AND FEEDING MEANS Filed Jan. 20, 1955     2 Sheets-Sheet 1

Inventor
Edward H. Cumpston Jr.
by Roberts, Cushman & Grover
Att'ys

Sept. 6, 1960     E. H. CUMPSTON, JR     2,951,518
WOOD SHAVING MACHINE WITH ROTARY CUTTER
HEAD AND FEEDING MEANS
Filed Jan. 20, 1955     2 Sheets-Sheet 2

Inventor
Edward H. Cumpston Jr.
by Roberts, Cushman & Grover
Att'ys

United States Patent Office 2,951,518
Patented Sept. 6, 1960

2,951,518

WOOD SHAVING MACHINE WITH ROTARY CUTTER HEAD AND FEEDING MEANS

Edward H. Cumpston, Jr., Pittsfield, Mass., assignor, by mesne assignments, to E. D. Jones Corporation, Pittsfield, Mass., a corporation of Delaware Filed Jan. 20, 1955, Ser. No. 483,120

11 Claims. (Cl. 144—172)

This invention relates to the production of thin wood shavings for use in making paper pulp, hardboard, etc., and has for its objects the rapid and economical production of thin shavings of uniform thickness without substantial wood damage, the production of pulp of superior strength and the production of a machine for these purposes, which is simple and inexpensive in construction, which can be easily and quickly sharpened and which is durable and reliable in use.

The present invention involves a log shaver comprising a rotary cutter head, means for guiding to the head logs extending lengthwise of the axis of the head, and slicers mounted on the periphery of the head at spaced locations around the head, the slicers having cutting edges which extend lengthwise of the head and whose outer ends are substantially concentric with the aforesaid axis so that there is no substantial clearance behind the edges, thereby to slice thin shavings of substantially uniform thickness throughout their areas. The means for guiding the logs is directed toward the head approximately radially and inclines upwardly. The diameter of the cutting head should be at least twice that of the logs. In the preferred embodiment each slicer comprises a row of sections extending lengthwise of the head with all of the cutting edges located at the same radius but with the cutting edges of the respective sections of each row offset relatively to each other circumferentially of the head, preferably by providing grooves in the front faces of the slicers, thereby to divide the shavings into sections corresponding to the aforesaid sections. Preferably the logs are fed to the cutting head positively and individually at uniform speed.

In a more specific aspect the feeding means includes a chute together with means to push the logs through the chute, the pushing means including a series of fingers which project upwardly through the ramp constituting the bottom of the chute and, as the logs approach the cutter head, swing downwardly about an axis parallel to the axis of the cutter head so as to slide under the logs with the points of engagement between the fingers and logs gradually receding from the aforesaid parallel axis, thereby tending to accelerate the logs, the ends of the fingers curving rearwardly to compensate for this tendency. Preferably the ramp inclines upwardly and is convex lengthwise in the region of the aforesaid parallel axis to compensate for the curvature of the logs as the fingers slide under the logs.

To feed the logs to the cutter head at uniform speed the aforesaid curvatures should bear a definite relationship to the maximum diameter of the logs and therefore to the depth of the chute through which the logs are fed to the cutter head, the depth of the chute approximating the maximum diameter of the logs. Referring to the aforesaid dimension as D, the curvature of the faces of the fingers should be involute based on a circle whose diameter is approximately 3D, the diameter of the ramp curve should be approximately 9D, the diameter of the feed rotor should be approximately 4D to the tips of the feed fingers, and the diameter of the cutter head should be at least approximately 2D.

For the purpose of illustration a typical embodiment of the invention is shown in the accompanying drawing in which Fig. 1 is a plan view;

Figure 1:
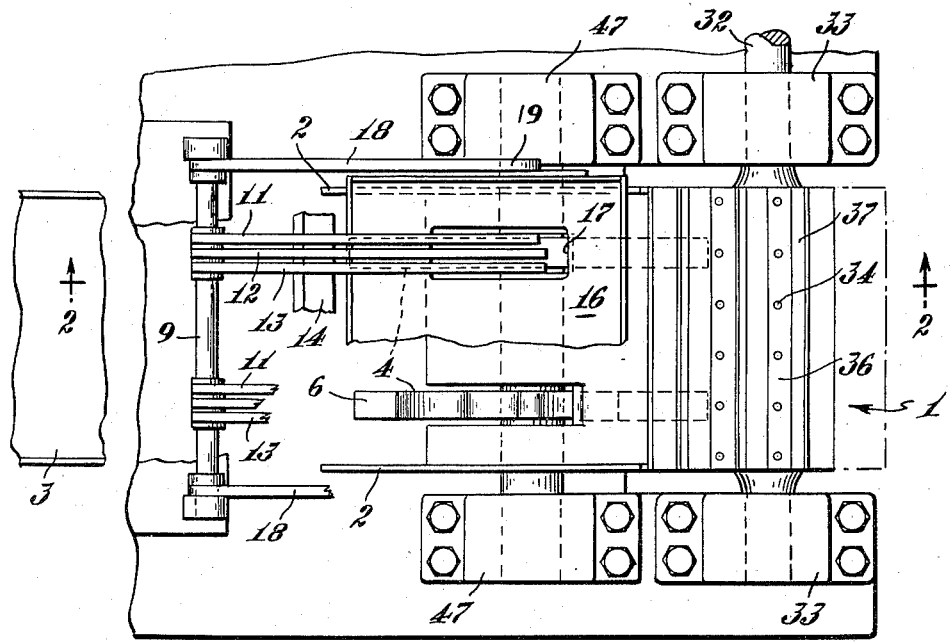

The particular embodiment of the invention chosen for the purpose of illustration comprises a rotary cutter head 1, a chute 2 through which logs are fed to the cutter head from a platform 3, the logs being propelled to the cutter head by means of a rotor 4 having fingers 6 projecting through slots 7 in the ramp 8 constituting the bottom of the chute. Pivotally mounted on a shaft 9 are sets of detents 11, 12 and 13 for holding the logs against retrograde movement. A stop 14 limits the downward movement of the detents. Disposed over the chute is a cover 16 which is pivotally mounted at 19 on arms 18 which are in turn pivotally supported on the shaft 9, the cover resting on the sides of the chute by gravity and preferably being weighted to restrain the logs from riding up on each other. The cover 16 is provided with slots 17 through which the noses of the detents 11, 12 and 13 extend. At the end of the chute adjacent the cutter head is an extension 21 secured by bolts 22. Under the extension is an adjustable support comprising a bed plate 23 extending the full width of the chute, the plate being mounted on support 24 which is pivoted on the frame at 26. The bed plate 23 is preferably formed of soft metal and is detachably mounted with screws 27 so as to be replaceable. Screws 28 and 29 are provided to adjust the extent to which the plate 23 extends beyond the end of the extension 21 so that the edge of the plate 23 can be accurately adjusted in very close proximity to the path of the cutting edges on head 1. Screw 28 threads through a frame member 31 and bears on support 24, whereas screw 29 extends freely through the frame member and threads into the frame member. Thus the two screws hold the support 24 in adjusted position. Preferably a pair of such screws is provided at each end of the support.

The cutter head 1 is mounted on a shaft 32 journaled in bearings 33. Mounted in recesses in the periphery of the cutter head by means of screws 34 and clamping plates 36 are knives 37. A characteristic feature of the knives consists in that the outer ends or peripheral faces 38 are substantially concentric with the axis of the cutter head, instead of having clearance as usual. Thus the knives may be ground while mounted on the head by rotating the head past a grinder. However the principal advantage of this feature is that the knives cut thin uniform shavings without tendency to dig into the logs because the peripheral surfaces of the cutters, having no clearance, resist the advance of the logs and prevent the logs from being pulled into the cutters. This feature also contributes largely to the markedly superior strength of the pulp made from these shavings.

Figure 4:
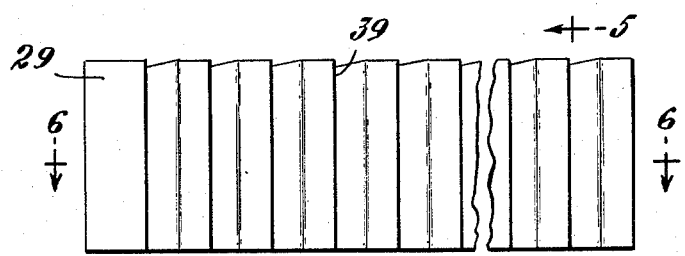
Fig. 4 is a front elevation of one of the slicer knives.
Figure 5:
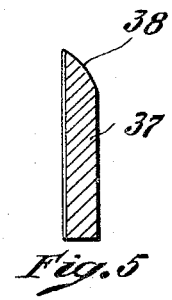
Fig. 5 is a section on line 5—5 of Fig. 4.
Figure 6:
Fig. 6 is a section on line 6—6 of Fig. 4.

As shown in Figs. 4, 5 and 6 the front faces of the knives 37 are preferably provided with grooves 39 to divide each shaving into ribbons whose widths are equal to the groove intervals, one side of each groove being approximately perpendicular to the face of the cutter and the other side being inclined and extending only part way toward the next groove. Inasmuch as the entire cutting edge is at the same distance from the axis of the cutting head, each shaving is of uniform thickness throughout the length of the cutter, notwithstanding the grooves which merely serve to divide the shaving into ribbons. The relationship between the locations of the grooves in successive knives is not important because the knives leave smooth cuts without producing substantial sawdust.

The chute 2 comprises two end pieces 41 (Fig. 2) carrying trunnions 42 which are pivotally mounted in bearings 43 on the stationary frame so that the entire chute may be swung counterclockwise to give access to the parts beneath the chute. Normally the chute bears on the stationary support 31 through the medium of a rib member 44 secured to the bottom of the chute.

Figure 2:
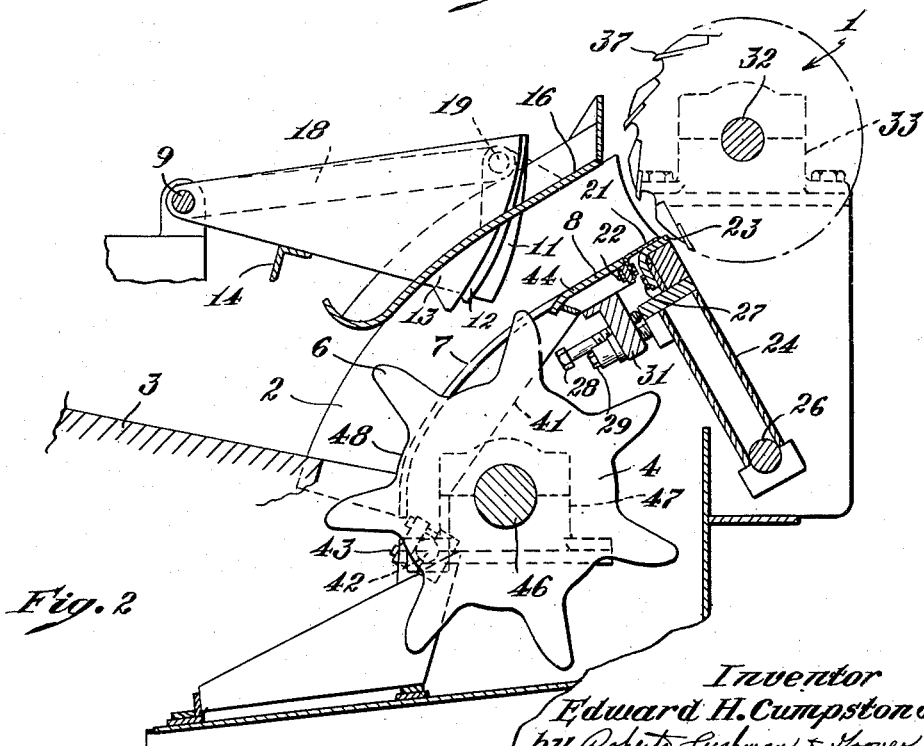
Fig. 2 is a section on line 2—2 of Fig. 1.
Figure 7:
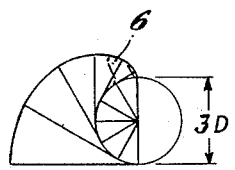
Fig. 7 is a diagram showing how the shape of the feed fingers is determined.

The feeding rotor 4 is mounted on shaft 46 journaled in bearings 47. The fingers 6 are spaced apart far enough to receive a log between each pair of successive fingers. The bottoms 48 of the recesses between the fingers are preferably spaced from the axis of the rotor approximately the same distance as the ramp at the location along the ramp nearest to the axis (Fig. 2). The front faces of the fingers which engage the logs are approximately radial from their inner ends throughout a distance somewhat more than one-half the diameter of the logs and thence the faces curve rearwardly. In order to obtain uniform feed as the fingers retract from the log chute the curvature of the faces of the outer ends of the fingers are preferably involute based on a circle whose diameter is approximately three times the diameter of the logs as illustrated in Fig. 7. Except for this curvature the fingers would tend to accelerate the logs as they slide under the logs owing to the fact that the points of engagement between the fingers and the logs gradually move outwardly from approximately the middle of the fingers to their outer tips. By virtue of the involute curvature this tendency is counteracted.

As the fingers slide under a log the rate of feed would gradually decrease if the ramp 7 were straight, this being due to the fact that, owing to the curvature of the log, the points of engagement between the fingers and the log gradually advance along the lower side of the log. By making the ramp circular on a diameter nine times the diameter of the logs this tendency is counteracted.

Figure 3:
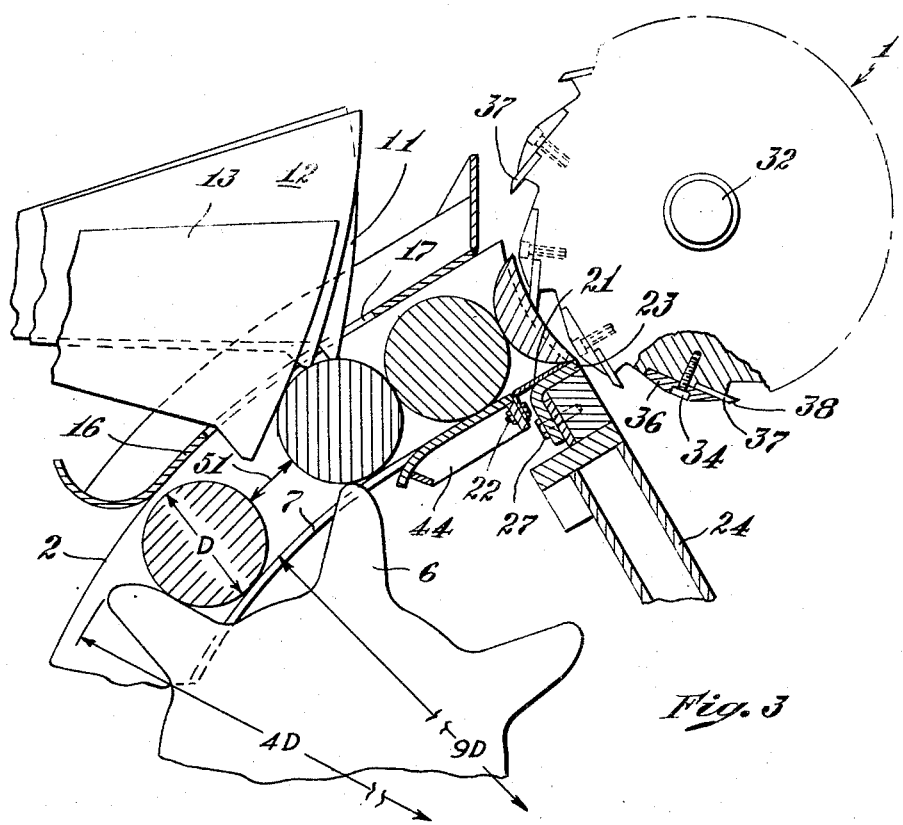
Fig. 3 is a similar view on an enlarged scale.

In operation, logs on platform 3 roll down between successive fingers, one log being picked up by each pair of fingers. After being picked up by the fingers each log is first advanced into contact with the next preceding log after which it pushes the preceding logs ahead. When each pair of fingers reaches the position occupied by finger 6 in Fig. 3 the tips of the fingers pass under the log, the detents 11, 12 and 13 holding the log against retrograde movement. In the illustration the spacing of the fingers is such that the distance 51 between logs (Fig. 3) is approximately one-half the diameter of the log, in which case logs are fed to the cutter head intermittently with the feed intervals about twice the rest intervals. Because of the aforesaid curvature of the fingers and the spacing therebetween, only one log is received in each recess between fingers, the next log being pushed back by the curved finger tips.

As illustrated the spacing is preferably such that one or more logs are interposed between the one being cut and the one being pushed by the feeder, so that there is some compression of the series of logs, this compression being maintained by the detents 11 to 13 while a new log is being brought up. The new log does not begin to push the preceding series until the fingers start to retract through the ramp and the points of engagement between fingers and log are on the curved portions of the fingers.

By feeding the logs at uniform speed and using knives without clearance, shavings of uniform thickness are produced without tendency for the knives to dig into the logs and produce non-uniform thicknesses. The thickness of the shavings depends upon the relative speeds of the cutter head and feed rotor, it being understood of course that the shafts 32 and 46 are synchronized so that the speed ratio remains constant, except for adjustments for different shaving thicknesses. To make shavings 0.04" thick from logs 8" in diameter or less the following specifications are recommended: 10 knives, cutter head diameter out to the cutting edges 20"; incline of ramp 30° to horizontal; diameter of feed rotor out to the tips of the fingers 6 approximately 36"; the diameter of the ramp curve approximately 72"; speed of cutter head 1200 r.p.m.; and rate of the log feed 40 f.p.m.

An important feature of the machine consists in the adjustability of the support 24 so that, notwithstanding wear, the clearance between the knives and bed plate 23 can be kept at a minimum, thereby preventing splinters from breaking off at the end of each cut. By making the bed plate of soft metal the adjustment may be made while the machine is running without danger of damaging the knives.

The circumferential dimension of the heel, that is the peripheral face of each blade, should bear a certain relationship to the spacing of the blades, depending upon the type of wood and the thickness of the chips. For example, in making chips of a thickness of the order of 0.025" from soft pine logs, the ratio may be of the order of from 1:10 to 1:20 with a heel of 0.6" to 0.3".

It should be understood that the present disclosure is for the purpose of illustration only and that this invention includes all modifications and equivalents which fall within the scope of the appended claims.

I claim:

1. A log shaver comprising a rotary cutter head, means for guiding to the head, along a path which approaches the head approximately radially, logs extending lengthwise of the axis of the head, means for positively feeding logs along said path, and, mounted on the periphery of the head at spaced locations around the head, slicers whose cutting edges extend lengthwise of the head and whose outer ends are concentric with said axis so that there is no clearance behind said edges, thereby to slice thin shavings of uniform thickness throughout their areas.

2. A log shaver comprising a rotary cutter head, means for guiding to the head logs extending lengthwise of the axis of the head and, mounted on the periphery of the head at spaced locations around the head, slicers whose cutting edges extend lengthwise of the head and whose outer ends are concentric with said axis so that there is no clearance behind said edges, each of said slicers comprising a row of sections extending lengthwise of the head, all of the cutting edges being located at the same radius but the adjacent ends of the cutting edges of the respective sections of each row being offset relatively to each other circumferentially of the head, thereby to divide the shavings into sections corresponding to said sections.

3. A log shaver comprising a rotary cutter head, means for guiding to the head logs extending lengthwise of the axis of the head and, mounted on the periphery of the head at spaced locations around the head, slicers whose cutting edges extend lengthwise of the head and whose outer ends are concentric with said axis so that there is no clearance behind said edges, each of said slicers having on its forward face transverse grooves extending to the cutting edge, thereby to divide each shaving into ribbons.

4. A log shaver comprising a rotary cutter head, means for guiding to the head, along a path which inclines upwardly and which approaches the head approximately radially, logs extending lengthwise of the axis of the head, means for feeding logs along said path positively and individually and, mounted on the periphery of the head at spaced locations around the head, slicers whose cutting edges extend lengthwise of the head and whose outer ends are concentric with said axis so that there is no clearance behind said edges, thereby to slice thin shavings of uniform thickness through out their areas.

5. A log shaver comprising a ramp, a rotary cutter head at the end of the ramp, means for supporting the cutter head to rotate about a horizontal axis extending transversely of the ramp, and means to push logs along the ramp, said means including a series of fingers which project upwardly through the ramp a distance which at least approximates the radii of the logs and as the logs approach the cutter head swing downwardly about an axis parallel to said axis so as to slide under the logs with the points of engagement between fingers and logs gradually receding from said parallel axis, thereby tending to accelerate the logs, the outer ends of the faces of the fingers curving rearwardly to compensate for said tendency.

6. A log shaver comprising a ramp, a rotary cutter head at the end of the ramp, means for supporting the cutter head to rotate about a horizontal axis extending transversely of the ramp, and means to push logs upwardly along the ramp, said means including a rotor having its axis below the ramp parallel to said axis, the rotor having a series of peripheral fingers which project through the ramp a distance which at least approximates the radii of the logs and as the logs approach the cutter head swing downwardly about said parallel axis so as to slide under the logs with the points of engagement between fingers and logs gradually receding from said parallel axis, thereby tending to accelerate the logs, the ends of the fingers curving rearwardly to compensate for said tendency, the diameter of the rotor to the tips of said fingers being approximately 4D, where D approximates the maximum diameter of the logs.

7. A log shaver comprising a ramp, a rotary cutter head at the end of the ramp, means for supporting the cutter head to rotate about a horizontal axis extending transversely of the ramp, and means to push logs along the ramp, said means including a series of fingers which project upwardly through the ramp a distance which at least approximates the radii of the logs and as the logs approach the cutter head swing downwardly about an axis parallel to said axis so as to slide under the logs with the points of engagement between fingers and logs gradually receding from said parallel axis, thereby tending to accelerate the logs, the outer ends of the faces of the fingers having rearward curvature to compensate for said tendency, said curvature being involute based on a circle whose diameter is approximately 3D, where D approximates the maximum diameter of the logs.

8. A log shaver comprising a ramp, a rotary cutter head at the end of the ramp, means for supporting the cutter head to rotate about a horizontal axis extending transversely of the ramp, and means to push logs along the ramp, said means including a series of fingers which project upwardly through the ramp a distance which at least approximates the radii of the logs and as the logs approach the cutter head swing downwardly about an axis parallel to said axis so as to slide under the logs with the points of engagement between fingers and logs gradually receding from said parallel axis, thereby tending to accelerate the logs, the outer ends of the faces of the fingers curving rearwardly to compensate for said tendency, and said ramp being convex lengthwise in the region of said parallel axis to compensate for the curvature of the logs as the fingers slide under the logs.

9. A log shaver comprising a ramp, a rotary cutter head at the end of the ramp, means for supporting the cutter head to rotate about a horizontal axis extending transversely of the ramp, and means to push logs along the ramp, said means including a series of fingers which project upwardly through the ramp a distance which at least approximates the radii of the logs and as the logs approach the cutter head swing downwardly about an axis parallel to said axis so as to slide under the logs with the points of engagement between fingers and logs gradually receding from said parallel axis, thereby tending to accelerate the logs, the outer ends of the faces of the fingers curving rearwardly to compensate for said tendency, said ramp being convex lengthwise in the region of said parallel axis to compensate for the curvature of the logs as the fingers slide under the logs, and the diameter of curvature of the ramp being approximately 9D, where D approximates the maximum diameter of the logs.

10. A log shaver comprising a ramp, a rotary cutter head at the end of the ramp, means for supporting the cutter head to rotate about a horizontal axis extending transversely of the ramp and means to push logs along the ramp, said means including a rotor having its axis below the ramp parallel to said axis, the rotor having a series of peripheral fingers which project through the ramp a distance which at least approximates the radii of the logs and as the logs approach the cutter head swing downwardly about said parallel axis so as to slide under the logs with the points of engagement between fingers and logs gradually receding from said parallel axis, thereby tending to accelerate the logs, the outer ends of the faces of the fingers having rearward curvature to compensate for the tendency, said curvature being involute based on a circle whose diameter is approximately 3D, and the diameter of curvature of the ramp being approximately 9D, where D approximates the maximum diameter of the logs.

11. A log shaver comprising a ramp, a rotary cutter head at the end of the ramp, means for supporting the cutter head to rotate about a horizontal axis extending transversely of the ramp and means to push logs along the ramp, said means including a rotor having its axis below the ramp parallel to said axis, the rotor having a series of peripheral fingers which project through the ramp a distance which at least approximates the radii of the logs and as the logs approach the cutter head swing downwardly about said parallel axis so as to slide under the logs with the points of engagement between fingers and logs gradually receding from said parallel axis, thereby tending to accelerate the logs, the outer ends of the faces of the fingers having rearward curvature to compensate for said tendency, said curvature being involute based on a circle whose diameter is approximately 3D, the diameter of the rotor to the tips of said fingers being approximately 4D, and the diameter of curvature of the ramp being approximately 9D, where D approximates the maximum diameter of the logs.

References Cited in the file of this patent

UNITED STATES PATENTS

| | | |
|---|---|---|
| 197,465 | Gleason | Nov. 27, 1877 |
| 375,812 | Harris | Jan. 3, 1888 |
| 439,007 | Henry | Oct. 21, 1890 |
| 550,838 | Nelson | Dec. 3, 1895 |
| 1,243,734 | Haber | Oct. 23, 1917 |
| 1,515,377 | White | Nov. 11, 1924 |
| 1,538,066 | Street | May 19, 1925 |
| 1,543,919 | Habighurst | June 30, 1925 |
| 1,847,990 | Stoner | Mar. 1, 1932 |
| 1,861,787 | Buchan | June 7, 1932 |
| 2,123,580 | Wheless | July 12, 1938 |
| 2,130,457 | Fickett | Sept. 20, 1938 |
| 2,252,845 | Gantzer | Aug. 19, 1941 |
| 2,254,097 | Wood | Aug. 26, 1941 |
| 2,634,062 | Forman | Apr. 7, 1953 |
| 2,699,831 | Gartner | Jan. 18, 1955 |
| 2,710,635 | Alexander | June 14, 1955 |
| 2,751,947 | Wyss | June 26, 1956 |

FOREIGN PATENTS

| | | |
|---|---|---|
| 160,301 | Australia | Dec. 17, 1954 |
| 170,744 | Canada | July 11, 1916 |
| 1,056,436 | France | Oct. 21, 1953 |